Feb. 9, 1960 L. HOCHGRAF 2,924,667
REDUCTION OF TRANSMISSION LOSS IN BRIDGED SUBSCRIBER LOOPS
Filed Aug. 13, 1957
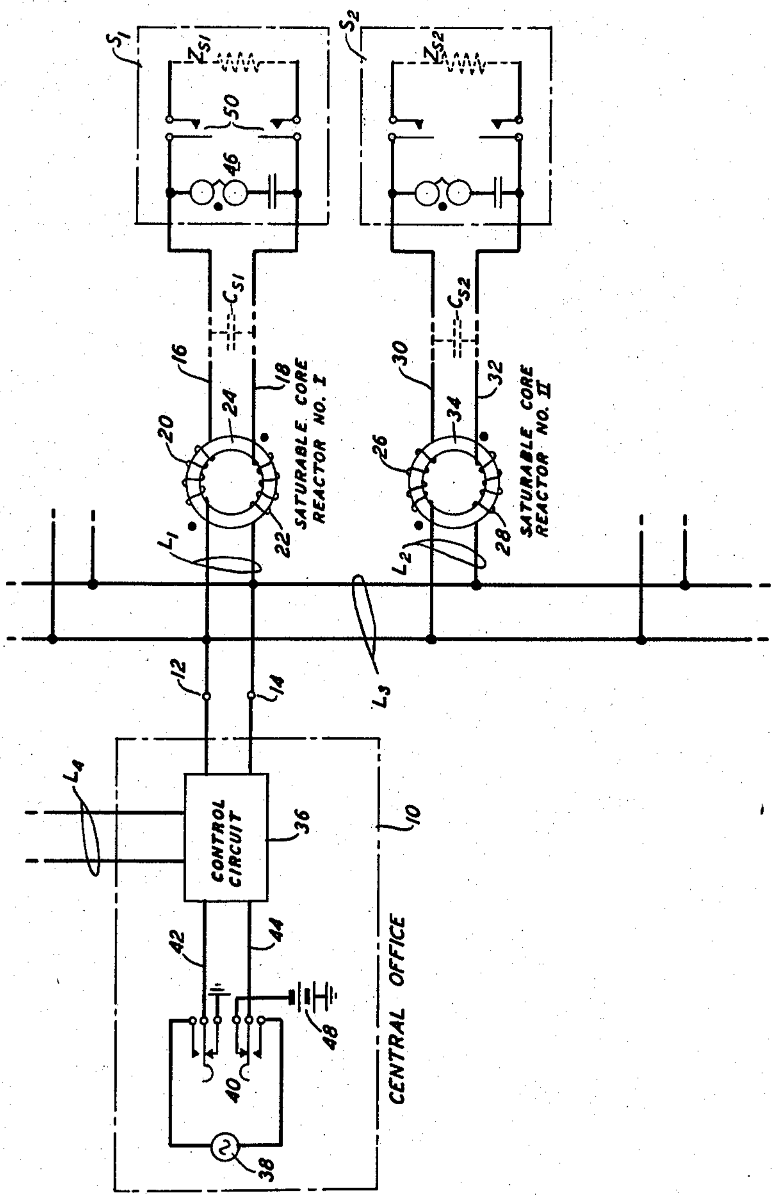
INVENTOR
L. HOCHGRAF
BY W. L. Keefauver
ATTORNEY United States Patent Office 2,924,667

Patented Feb. 9, 1960

2,924,667

REDUCTION OF TRANSMISSION LOSS IN BRIDGED SUBSCRIBER LOOPS

Lester Hochgraf, Madison, N.J., assignor to Bell Telephone Laboratories, Incorporated, New York, N.Y., a corporation of New York Application August 13, 1957, Serial No. 677,974

16 Claims. (Cl. 179—35)

This invention relates to improvements in communication systems and more particularly to the reduction of transmission losses in multiloop transmission systems.

It often happens in the design or installation of communication systems that it is desirable to connect two or more communication channels in multiple. This is particularly true in telephone systems where, in rendering certain services, it is common practice to bridge subscriber loops or wire pairs across a common transmission medium. This medium may be, for example, a common line terminating in a central office, or terminal equipment of channels for the transmission or reception of signals. The need for this expedient arises, for example, where multiparty lines are provided or where so-called secretarial services are given. Further, it is quite common for professional men who have business lines in their offices to have extensions of these lines located at their residences which may be at some distance from their offices and frequently in another exchange area.

One problem which results from this practice of multiply-connecting subscriber loops is that of overcoming the increase in transmission loss caused by the combined shunt capacity of these loops. Due to this capacity, the parallel connection or multipling of a plurality of subscriber loops increases the transmission loss in any one of them which may be active, even though all the others are open-circuited or idle. Moreover, this problem becomes more pronounced with increasing loop length.

Accordingly, it is an object of the present invention to improve signal transmission in communication systems having multiply-connected transmission paths.

More specifically, it is an object of this invention to reduce substantially transmission losses in telephone systems where two or more wire pairs are connected in multiple.

The use of relatively expensive and complicated relay circuits to improve speech transmission in telephone systems having multiply-connected subscriber loops has been known in the art. Such circuits are commonly called "bridge lifters." As representative of this practice, U.S. Patent No. 2,041,879, which issued May 26, 1936, to H. W. Ulrich, is noted. The relay circuits, shown therein to effect an improvement in speech transmission require considerable auxiliary circuitry, are relatively costly and detailed, and present maintenance problems inherent in devices having moving parts and contacts. As a result, these relay circuits have been used with considerable discretion, and only when such improvement in speech transmission has been found mandatory. Wherever possible, therefore, the use of "bridge lifting" means for reducing speech transmission losses in bridged subscriber loops has been avoided. With conventional present-day telephone lines, the general rule is that, without bridge lifters, the total length of multipled lines, excluding the common line from the central office should not exceed 6,000 feet. For non-loaded lines, fulfillment of this requirement is sufficient; but loaded lines have the additional requirement that there not be any bridged loops between the central office and any loading coil and that any bridged loops meeting this requirement be themselves non-loaded.

Accordingly, it is another object of this invention to make more economical and simple the means by which the reduction of transmission losses in telephone systems having bridged subscriber loops is effected. It is a related object to make such means small and rugged so that a minimum of maintenance and protection is required.

In an illustrative embodiment of the present invention, described in more detail below, bridged-tap losses as they are sometimes known, are greatly reduced. This is accomplished by connecting saturable core reactors in series with each multipled loop near the point at which the loop is bridged on the common line. The impedances of these reactors depend on loop direct current and are such as to introduce a negligible loss into active loops but a very high loss into idle loops. Idle loops thus appear to the common line as substantially open circuits so that their attendant shunt capacity does not result in a bridged loss on an active loop.

It is a well-known property of the saturable core reactor that it has a relatively high inductance when its core is unsaturated, and a relatively low inductance when its core is saturated. That value of current which is necessary to cause this saturated condition is known as the saturation current. Further reference as to the nature and properties of saturable core reactors (or saturable core inductors as they are often called) may be made to the following literature: G. W. Elman, "Magnetic Alloys of Iron, Nickel, and Cobalt," 54 Electrical Engineering 1292 (December 1935); and E. Peterson, "Coil Pulsers for Radar," 25 Bell System Technical Journal 603 (October 1946).

A fuller understanding of the nature of the invention and of its various objects, features, and advantages may be had from a consideration of an illustrative embodiment now to be described with reference to the accompanying partially schematic drawing which shows an illustrative system in accordance with the invention in which a plurality of subscriber loops are multiply-connected to a common line terminating in a central office.

In the drawing, two relatively long subscriber loops $L_1$ and $L_2$, the terminations of which are located at some distance from each other and from their associated central office 10, are connected in multiple at the central office to common terminals 12 and 14 by way of a common line $L_3$.

For the sake of simplicity, only two subscriber loops are shown. Likewise, wherever possible, the well-known particulars of the central office and those of substations $S_1$ and $S_2$ have been omitted. For the circuit details of a typical central office and substation, reference is made to Patent No. 2,585,904, which issued February 19, 1952, to A. J. Busch and to Patent No. 2,629,783, which issued February 24, 1953, to H. F. Hopkins, respectively.

Connected in series with loop conductors 16 and 18 of subscriber loop $L_1$ are windings 20 and 22, respectively, of saturable core reactor No. I. These windings are balanced-wound on a saturable core 24 to be series-aiding to loop (metallic) currents, as shown by the polarity markings. It follows, therefore, that these windings are wound in parallel-opposing relation to longitudinal currents. That the windings are balanced-wound should be understood to mean that they each have substantially the same impedance, have substantially the same number of turns, and are symmetrically disposed on core 24. This balancing of the windings is done to avoid the undesirable effects of core magnetization by longitudinal currents and is commonly called longitudinal balancing. The means (including those enumerated above) by which this balancing is achieved are well known in the art and are taught, for example, in Patent No. 2,326,053 to C. M. Morris, which issued August 3, 1943. It can be seen that the magnetic effects in core 24 of longitudinal currents induced in conductors 16 and 18 will cancel out, thereby avoiding the magnetization of core 24 by these currents. Similarly, the windings 26 and 28 of saturable core reactor No. II are serially inserted in loop conductors 30 and 32, respectively, of subscriber loop $L_2$ and are balanced-wound on core 34 in series-aiding relation to loop currents. The magnetic paths of saturable cores 24 and 34 may have tolerable discontinuities (air gaps) as, for example, in the case of a tape-wound core, or they may have continuous magnetic paths, everywhere having a permeability greater than one as, for example, in the case of a laminated disc-type core.

Control circuit 36 serves the purpose of answering or extending calls on the various subscriber loops. The ringing generator 38 serves the purpose of ringing the various substations and, by operation of key 40, is connected via conductors 42 and 44, control circuit 36, and common line $L_3$ to any substation to be rung.

Various combinations of calls are possible in the system shown. For example, a subscriber may wish to call another subscriber multipled to the same common line. This is what is commonly known as a "revertive" call. Illustrative of another type of call, the subscriber at substation $S_1$ may wish to call or be called by another subscriber connected to an outside line $L_4$ terminating at the central office 10. This is what is commonly known as an "outside" call. The principles of the invention apply in either case.

Let it be assumed, therefore, that a subscriber (not shown) connected to line $L_4$ desires to call the subscriber at substation $S_1$. The proper connections are made in the control circuit 36, ringing key 40 is operated, and ringing current is supplied by ringing generator 38 to ringer 46 of substation $S_1$. The ringing current is of sufficient amplitude to saturate any or all of the saturable cores and, therefore, the core 24 of saturable core reactor No. I becomes saturated so that the windings 20 and 22 present a relatively low impedance to ringing currents passing therethrough. Likewise, if the ringing circuit associated with substation $S_2$ is designed to respond to the same type of ringing signal to which substation $S_1$ responds, the ringing current in loop $L_2$, in flowing through windings 26 and 28, will saturate core 34 and thereby ring substation $S_2$.

When substation $S_1$ responds to the call, i.e., goes off-hook, loop $L_1$ is said to be active and a direct-current path is completed in a well-known manner from the central office battery 48, through the switchhook contacts 50 and the remainder of the substation direct current circuit, shown here simply as an effective impedance $Z_{s1}$. The loop direct current supplied by battery 48 flows through windings 20 and 22 of reactor No. I and is sufficient in magnitude to saturate core 24. When saturated, reactor No. I presents a negligible impedance (e.g., less than 100 ohms at one kilocycle per second) to speech currents on the loop.

If substation $S_2$ remains on-hook, i.e., idle, no direct-current path from battery 48 is completed in loop $L_2$ and core 34 remains unsaturated. Reactor No. II thus presents a relatively high impedance (e.g., more than 20,000 ohms at one kilocycle per second) to speech currents, and effectively removes the stray capacity $C_{s2}$ as a bridging loss on active loop $L_1$. Were it not for reactor No. II, loop $L_2$, by virtue of its stray capacity $C_{s2}$, would introduce a substantial transmission loss into active loop $L_1$ even though substation $S_2$ is off-hook and is an open circuit for direct current. This loss, however, is avoided by the provision of a saturable reactor, as shown, in physical and electrical proximity to the bridging point on line $L_3$.

Reactor No. I similarly prevents a transmission loss on loop $L_2$ when loop $L_2$ is active and loop $L_1$ idle. The same principles are applicable in an obvious manner where more than two loops are bridged on the line. Of course, where several loops are active at once, as, for example, where substation $S_1$ is in a revertive talking connection with substation $S_2$, it is necessary that the common battery 48 supply sufficient current to saturate the reactors of all active circuits. Or, stated otherwise, it is necessary in such a situation that the reactors have sufficiently low saturation currents to achieve a low impedance condition when their associated loops are active. However, it is to be understood that these saturation currents should not be so low that speech currents alone will suffice to saturate the reactors. This would render the reactors ineffective as bridge lifters, for when their associated loops are idle, they must offer a high impedance to speech currents.

The saturable core reactor meets the requirement that it work substantially equally well whether metallic or grounded ringing is provided in the various loops of the system. This result is achieved by making the ringing current in one of the loop conductors alone of sufficient amplitude to cause saturation of the core associated with the loop. Metallic ringing, of course, is accomplished by shunting the ringer of a substation across its associated loop, as is shown in the drawing; whereas grounded ringing is accomplished by grounding one side of the ringer and connecting the other side to one of the loop conductors. Thus, in the case of metallic ringing of, for example, substation $S_1$, ringing current would flow through both of the conductors 16 and 18 and therefore both of the windings 20 and 22; whereas in the case of grounded ringing of substation $S_1$, ringer 46 would be connected between ground and one of conductors 16 and 18 and ringing current would flow only through that one of these conductors and its associated winding.

Also, dialing pulses, which, for example, may be generated by interrupting the current from a direct-current source, are substantially unimpaired by the insertion of saturable core reactors in subscriber loops.

Thus, each of the reactors may be considered as a level differentiation device, presenting a high impedance to voice signals when it is in an unsaturated state, and a low impedance both to voice signals when it is saturated by common battery current and to ringing signals in the absence of common battery current.

Although the present invention has been described with reference of a specific embodiment, it should be considered as illustrative, for the invention comprehends also such other embodiments as come within its spirit and scope.

What is claimed is:

1. A communication system comprising a communication center, at least one arterial line connected to said center for the transmission of signals, a plurality of transmission lines multiply-connected to said arterial line and each terminated in means for the transmission and reception of said signals, a saturable core reactor individual to and connected in the path of signal current flow in each of said transmission lines, and means for saturating said reactors, said reactors each presenting a relatively high impedance to signal currents when unsaturated and a relatively low impedance to signal currents when saturated.

2. In a signal current communication system, a source of direct current, a common transmission medium for the transmission of said signal currents, a plurality of transmission lines each connected in multiple to said common transmission medium, means individual to and associated with each of said lines for completing a circuit therethrough for the transmission of direct current from said source, a plurality of saturable core reactors, one serially-included in each of said lines, said direct current being of sufficient magnitude to saturate all of said reactors, each of said reactors exhibiting a relatively high impedance to said signal currents when its associated line is enabled for the transmission of direct current and a relatively low impedance to said signal currents when its associated line is disabled for the transmission of direct current.

3. A communication system in accordance with claim 2 wherein each of said saturable core reactors is proximately-connected to said transmission medium.

4. In a telephone system, a central office including a source of ringing signals, a plurality of subscriber loops each including a substation comprising signalling means responsive to said ringing signals, a common transmission medium multiply-connected to said loops, means connecting said medium to said central office, and a reactor in each of said subscriber loops having a saturable core adapted to be saturated in response to said ringing signals.

5. A telephone system in accordance with claim 4 wherein said loops each comprise a pair of conductors and wherein each of said reactors comprises two windings wound on its associated saturable core, one of said windings being serially connected in one of the conductors of its associated subscriber loop and the other winding being serially connected in the other conductor of said associated subscriber loop.

6. A system in accordance with claim 5 wherein said windings are wound on said core in series-aiding relation to loop currents.

7. A telephone system in accordance with claim 6 in which each of said windings has substantially the same impedance, whereby the magnetic condition of each of said saturable cores is substantially unaffected by longitudinal currents in its associated subscriber loop.

8. In a telephone system, a plurality of normally open-circuited subscriber loops each comprising a pair of conductors, a reactor, and a terminating substation, said reactor having a saturable core and an even number of windings serially inserted in said pair of conductors and balanced-wound on said core in series-aiding relation to loop currents, said core saturating at a predetermined value of current through said windings, said terminating substation comprising means for completing a circuit through its associated loop, a common transmission medium connected in multiple to said loops and terminating in a central office comprising a source of direct current common to said subscriber loops, said direct current having a value equal to or greater than said predetermined value of saturation current.

9. A telephone system in accordance with claim 8 wherein said central office comprises ringing means for generating and distributing ringing currents to any of said loops of a magnitude sufficient to saturate any of said cores.

10. In a telephone system, a plurality of relatively long normally disabled subscriber loops each terminated at one end in a signal energy terminal, a longitudinally-balanced saturable core reactor comprising a saturable core associated with each of said loops and connected near the other end of its associated loop in the path of signal energy flow, individual means for enabling or disabling each of said loops for the transmission of direct current, and a common transmission medium connected in multiple to the said other ends of said loops, a central office including a source of direct current of sufficient magnitude to saturate the core associated with any of said loops, means for connecting said source to said medium, said central office further comprising means for selectively routing signals to and from said terminals, each of said reactors presenting a relatively high impedance to said signal energy when its associated loop is disabled for the transmission of direct current, thereby substantially eliminating the loss in signal transmission through enabled loops caused by the combined shunt capacity of disabled loops, and presenting a relatively low impedance to said signal energy when its associated loop is enabled.

11. A telephone system in accordance with claim 10 wherein said central office further comprises ringing means for generating and selectively routing ringing signals to any of said terminals, said ringing signals being of sufficient amplitude to saturate the core associated with any of said loops.

12. In combination, a first transmission line, a plurality of further transmission lines each connected to said first line and each terminated in an associated signal translating device, a source of direct current connected to said first transmission line, means for enabling each of said signal translating devices, means responsive to the enabling of each of said signal translating devices for completing a direct-current path from said source of direct current through the one of said further transmission lines associated with each of said signal translating devices, and a saturable core reactor connected in series with each of said further transmission lines in physical proximity to said first transmission line and relatively remote from its associated signal translating device, said reactors each being adapted to saturate in response to direct current flowing from said source.

13. In combination, a central office including a source of direct current, a plurality of telephone sets remote from said central office, each of said sets being adapted to receive and transmit speech signals in an off-hook condition and each being disabled for the transmission and reception of speech signals in an on-hook condition, said sets also being adapted to complete a direct-current path including said source of direct current only in said off-hook condition, a transmission line extending from said central office, transmission loops for each of said sets bridged across said line, each of said loops being characterized by sufficient stray capacity to introduce a substantial transmission loss into any loop whose associated set is off-hook, means for reducing said loss comprising a plurality of saturable core reactors one individual to and associated with each of said loops, and means connecting each of said reactors in series with its associated loop in physical proximity to said transmission line, each of said reactors being in an unsaturated condition and presenting a high impedance to speech signals in the absence of direct-current flow in its associated loop from said source, the impedance of each of said reactors to speech signals when saturated being relatively low.

14. A combination in accordance with claim 13 wherein each of said reactors is longitudinally-balanced.

15. A combination in accordance with claim 13 wherein said central office further includes a source of ringing current for alerting any of said telephone sets, said current being sufficient in amplitude to saturate any of said reactors.

16. A combination in accordance with claim 15 wherein said plurality of telephone sets comprises a pair of sets and wherein the magnitude of said direct current and the amplitude of said ringing current are each sufficient to simultaneously saturate the reactors associated with said pair of sets.

References Cited in the file of this patent

UNITED STATES PATENTS

| | | |
|---|---|---|
| 1,266,158 | Reid | May 14, 1918 |
| 2,192,061 | Woodworth | Feb. 27, 1940 |
| 2,332,043 | Atkins | Oct. 19, 1943 |

Notice of Adverse Decision in Interference

In Interference No. 91,473 involving Patent No. 2,924,667, L. Hochgraf, Reduction of transmission loss in bridged subscriber loops, final judgment adverse to the patentee was rendered Sept. 18, 1962, as to claim 1.

[*Official Gazette October 16, 1962.*]